(12) United States Patent
N et al.

(10) Patent No.: US 10,235,430 B2
(45) Date of Patent: Mar. 19, 2019

(54) SYSTEMS, METHODS, AND APPARATUSES FOR DETECTING ACTIVITY PATTERNS

(71) Applicants: Sivakumar N, Coimbatore (IN); Tu Truong, San Jose, CA (US); Nalini Chandhi, Fremont, CA (US); Nethaji Tummuru, Sunnyvale, CA (US); Manikanta Pachineelam, Union City, CA (US); Mario Ponce, Santa Clara, CA (US); Chao Zhou, Los Gatos, CA (US); Rahul Kabra, Sunnyvale, CA (US); Sakshi Chopra, Fremont, CA (US); Zhenhua Luo, Mountain View, CA (US); Jaehun Jeong, San Jose, CA (US)

(72) Inventors: Sivakumar N, Coimbatore (IN); Tu Truong, San Jose, CA (US); Nalini Chandhi, Fremont, CA (US); Nethaji Tummuru, Sunnyvale, CA (US); Manikanta Pachineelam, Union City, CA (US); Mario Ponce, Santa Clara, CA (US); Chao Zhou, Los Gatos, CA (US); Rahul Kabra, Sunnyvale, CA (US); Sakshi Chopra, Fremont, CA (US); Zhenhua Luo, Mountain View, CA (US); Jaehun Jeong, San Jose, CA (US)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 14/567,904

(22) Filed: Dec. 11, 2014

(65) Prior Publication Data
US 2016/0063072 A1     Mar. 3, 2016

(30) Foreign Application Priority Data

Sep. 1, 2014 (IN) .......................... 4261/CHE/2014

(51) Int. Cl.
*G06F 17/30* (2006.01)
*G06F 7/00* (2006.01)
(Continued)

(52) U.S. Cl.
CPC ...... *G06F 17/30554* (2013.01); *G06F 3/0482* (2013.01); *G06Q 30/01* (2013.01)

(58) Field of Classification Search
CPC ...... G06F 17/30; G06F 3/0484; G06F 3/0482; G06Q 30/00
(Continued)

(56) References Cited

U.S. PATENT DOCUMENTS 6,058,375 A  *  5/2000  Park ....................... G06Q 40/02
                                                       705/30
2004/0199828 A1 * 10/2004 Cabezas .............. G06F 11/0748
                                                       714/39
(Continued)

*Primary Examiner* — Kuen S Lu
(74) *Attorney, Agent, or Firm* — Schwegman Lundberg & Woessner, P.A.

(57) ABSTRACT

Systems, methods, and apparatuses for activity pattern detection are described herein. Embodiments may process large amounts of data from a plurality of different database sources in order to detect events common to the data of the different database sources. Embodiments further perform data mining operations to detect patterns (e.g., two or more events appearing consecutively or non-consecutively), and present these patterns in a graphical user interface (GUI) to illustrate how a plurality of patterns may comprise a business scenario.

25 Claims, 9 Drawing Sheets

(51) Int. Cl.
*G06Q 30/00* (2012.01)
*G06F 3/0482* (2013.01)

(58) Field of Classification Search
USPC .......................................................... 707/722
See application file for complete search history.

(56) References Cited

U.S. PATENT DOCUMENTS

| | | | | |
|---|---|---|---|---|
| 2008/0027786 A1* | 1/2008 | Davis | ................ | G06F 17/30333 |
| | | | | 705/7.29 |
| 2011/0161946 A1* | 6/2011 | Thomson | ................... | G06F 8/34 |
| | | | | 717/155 |
| 2012/0290610 A1* | 11/2012 | Hoang | ................... | G06Q 10/10 |
| | | | | 707/769 |
| 2014/0172919 A1* | 6/2014 | Johnston | ............... | H04L 41/069 |
| | | | | 707/797 |
| 2014/0257847 A1* | 9/2014 | Hu | ....................... | A61B 5/7282 |
| | | | | 705/3 |
| 2014/0351684 A1* | 11/2014 | Smit | .................... | G06F 17/212 |
| | | | | 715/222 |

* cited by examiner

SYSTEMS, METHODS, AND APPARATUSES FOR DETECTING ACTIVITY PATTERNS

CLAIM OF PRIORITY

The present patent application claims the priority benefit of the filing date of Indian Application No. 4261/CHE/2014 filed Sep. 1, 2014, the entire content of which is incorporated herein by reference.

TECHNICAL FIELD

This document generally relates to systems and methods for use with data storage and data analysis. More specifically, this document relates to methods and systems for detecting activity patterns in stored data.

BACKGROUND

Companies may record extremely large amounts of data by logging their customers' activities, e.g., purchasing transactions, web site visits, online search histories, customer care interactions, services usage, etc. Ideally, companies would like to use this data to find common patterns of activities, or even better, use this data to find reasons behind those activities. Based on this analysis, companies may be able to better understand their customers and, as a result, improve customer satisfaction and other aspects of their business. However, no tool exists that can process large amounts of data to identify patterns of activities common to different database sources and efficiently provide data analytics based on these common patterns of activities.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems, methods, and apparatuses for activity pattern detection are described herein. Embodiments may process large amounts of data from a plurality of different database sources in order to detect events common to the data of the different database sources. Embodiments further perform data mining operations to detect patterns (e.g., two or more events appearing consecutively or non-consecutively), and present these patterns in a graphical user interface (GUI) to illustrate how a plurality of patterns may comprise a business scenario.

Figure 1:
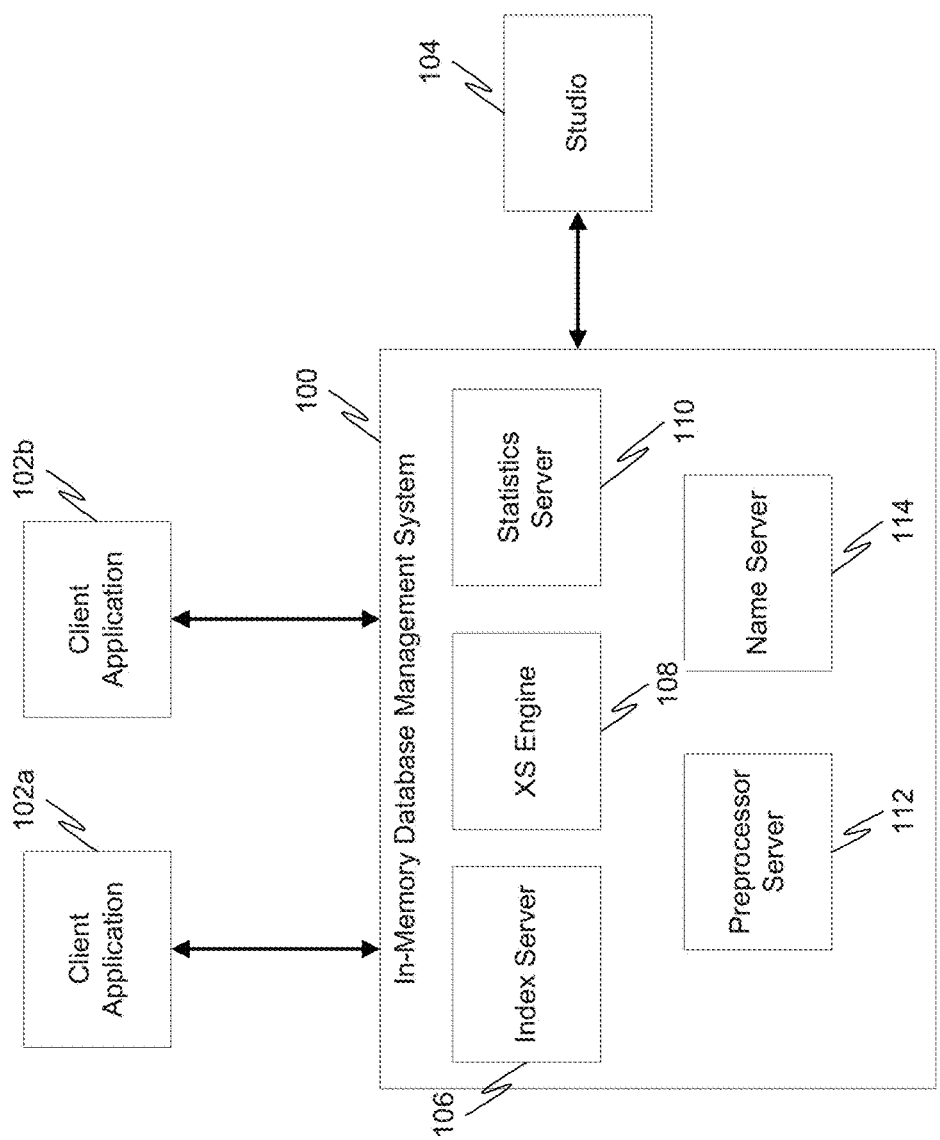
FIG. 1 is a diagram illustrating a system, in accordance with an example embodiment, for managing a plurality of different database sources used during the execution of business analytics processes.

FIG. 1 is a diagram illustrating a system, in accordance with an example embodiment, for managing a plurality of different database sources used during the execution of business analytics processes. In this embodiment, a database management system 100 comprises an in-memory database system; other embodiments may utilize database systems that utilize disk storage mechanisms. An in-memory database is a database management system that primarily relies on main memory for computer data storage. It is contrasted with database management systems that employ a disk storage mechanism. One example of an in-memory database is the HANA system from SAP AG of Walldorf, Germany.

The database management system 100 may be utilized in a larger transaction and analytics system. A particular example of a transaction and analytics system is the collaborative behavior of an OLTP ("Online Transaction Processing") system and an OLAP ("Online Analytical Processing") system. OLTP refers to a type of computer processing in which a computer system responds immediately to user requests as opposed to batch processing. Each request is considered to be a transaction. An OLAP refers to a category of software tools that provides analysis of data stored in a database. OLAP tools enable users to analyze different dimensions of multidimensional data such as time series and trend analysis views. An OLAP often is used in data mining. Typically an OLAP includes a server, which sits between a client and a database management system ("DBMS"). The OLAP server understands how data is organized in the database and has special functions for analyzing the data The in-memory database management system 100 may be coupled to one or more client applications 102a, 102b. The client applications 102a, 102b may communicate with the in-memory database management system 100 through a number of different protocols, including Structured Query Language (SQL), Multidimensional Expressions (MDX), Hypertext Transfer Protocol (HTTP), Representational State Transfer (REST), and Hypertext Markup Language (HTML). In an example embodiment, unique SQL commands are created, allowing the client application 102a, 102b to request that a particular data attribute calculation be performed by the in-memory database management system 100. In essence, this allows the client application 102a, 102b to request that data profiling be performed without actually performing any of the data profiling calculations itself. Also depicted is a studio 104, used to perform modeling by accessing the in-memory database management system 100.

The in-memory database management system 100 may comprise a number of different components, including an index server 106, an XS engine 108, a statistics server 110, a preprocessor server 112, and a name server 114. These components may operate on a single computing device, or may be spread among multiple computing devices (e.g., separate servers).

In an example embodiment, the index server 106 contains the actual data and the engines for processing the data. It also coordinates and uses all the other servers. In an example embodiment, new procedures are defined in the index server 106 to perform various data attribute calculations when requested by a client application 102*a*, 102*b*. In a further example embodiment, these new procedures are designed to receive and interpret SQL commands from the client applications 102*a*, 102*b*.

The name server 114 holds information about the database topology. This is used in a distributed system with instances of the database on different hosts. The name server 114 knows where the components are running and which data is located on which server.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which the text search capabilities are based.

The XS engine 108 allows clients to connect to the database management system 100 using HTTP.

Figure 2:
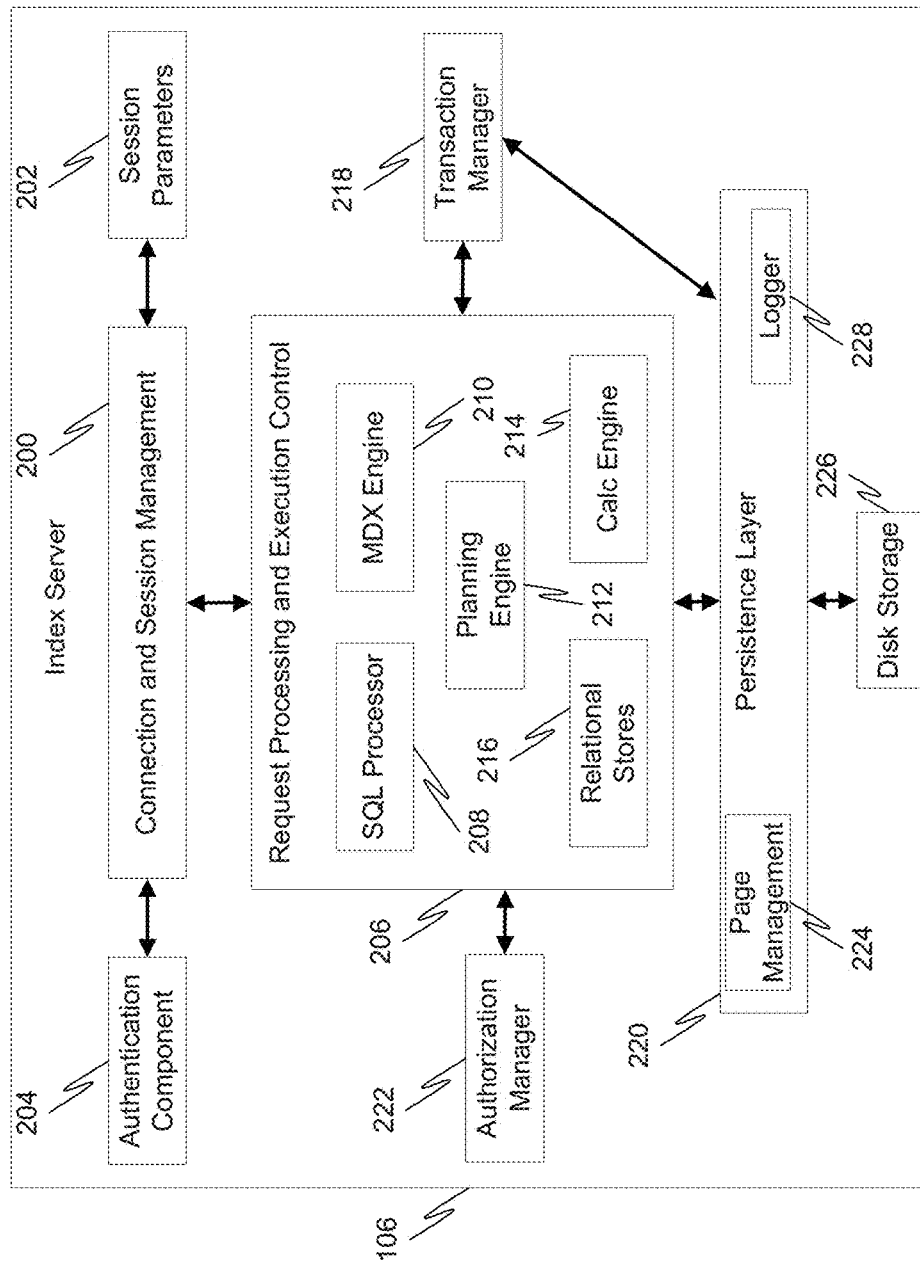
FIG. 2 is a diagram illustrating an index server in accordance with an example embodiment.

FIG. 2 is a diagram illustrating an index server in accordance with an example embodiment. The index server may, in some embodiments, be utilized as the index server 106 in the system of FIG. 1. The index server includes a connection and session management component 200, which is responsible for creating and managing sessions and connections for the database clients. Once a session is established, clients can communicate with the database system (e.g., database system 100 of FIG. 1) using SQL statements. For each session, a set of session parameters 202 may be maintained, such as auto-commit, current transaction isolation level, etc. Users are authenticated either by the database system itself (e.g., login with user name and password, using authentication component 204) or authentication can be delegated to an external authentication provider such as a Lightweight Directory Access Protocol (LDAP) directory.

The client requests can be analyzed and executed by a set of components summarized as request processing and execution control 206. The SQL processor 208 checks the syntax and semantics of the client SQL statements and generates a logical execution plan. Multidimensional expressions (MDX) is a language for querying and manipulating multidimensional data stored in OLAP cubes. As such, an MDX engine 210 is provided to allow for the parsing and executing of MDX commands. A planning engine 212 allows financial planning applications to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL script, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. The transaction manager 218 coordinates database transactions, controls transactional isolation, and keeps track of running and closed transactions. When a transaction is committed or rolled back, the transaction manager 218 informs the involved engines about this event so they can execute corresponding actions. The transaction manager 218 also cooperates with a persistence layer 220 to achieve atomic and durable transactions.

An authorization manager 222 is invoked by other database system components to check whether the user has the required privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to a separate disk storage 226, and also contains a logger 228 that manages the transaction log. Log entries can be written implicitly by the persistence layer 220 when data is written via the persistence interface or explicitly by using a log interface.

As discussed above, in some embodiments, all relevant database data is kept in main memory, so that read operations can be executed without requiring disk input or output. Additionally, database data may be stored in columns rather than rows. This allows for the use of high compression techniques, high performance reading contiguous data for column operations, and parallelization of the column processing. In a column store, data is already vertically partitioned. This means that operations on different columns can be easily processed in parallel by different processors or processor cores. If multiple columns need to be searched or aggregated, each of these operations can be assigned to a different processor core and/or computing cluster. In addition, the execution of operations within a single column can be further parallelized by dividing the column into multiple sections that are processed by different processor cores.

Figure 3:
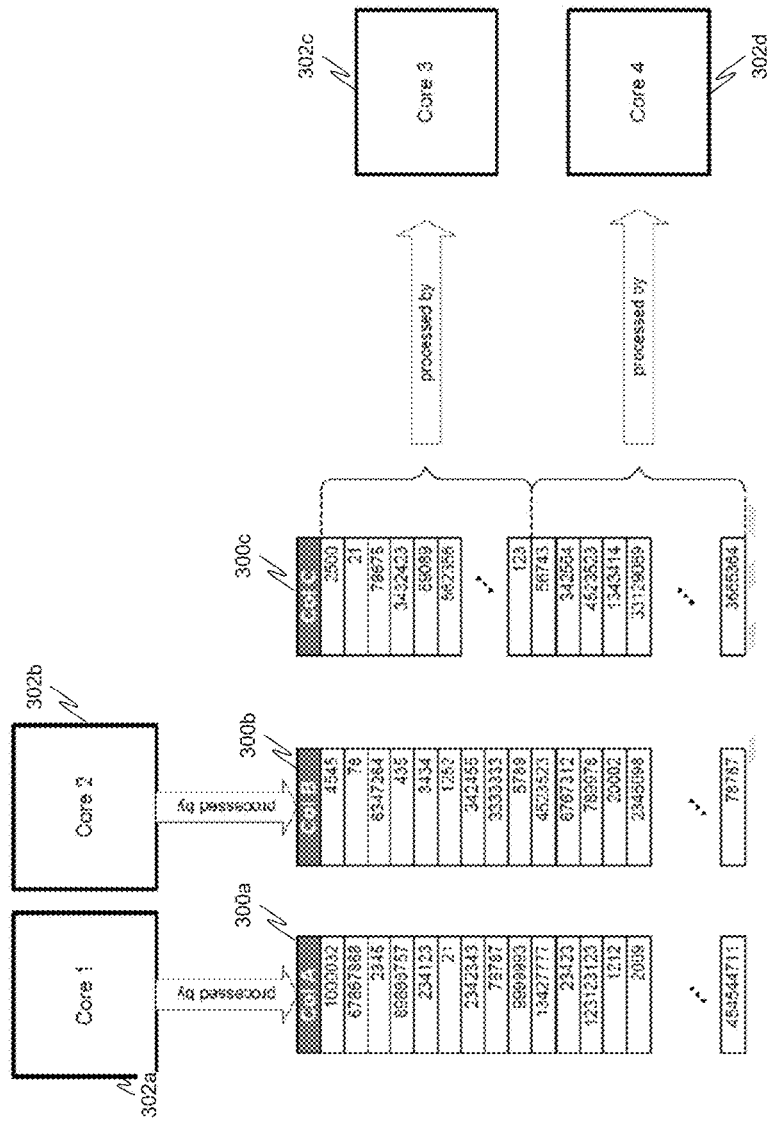
FIG. 3 is a diagram illustrating a process, in accordance with an example embodiment, to perform database processing related to business analytics operations.

FIG. 3 is a diagram illustrating a process, in accordance with an example embodiment, to perform database processing related to business analytics operations. Here, three columns 300*a*, 300*b*, 300*c* are depicted. The processing of column 300*a* can be performed by a first core 302*a*. The processing of column 300*b* can be performed by a second core 302*b*. The processing of column 300*c* can actually be split among two cores 302*c*, 302*d*.

In an example embodiment, specialized client software may be run by one or more client machines interfacing with the database system. This specialized client software may be known as an information steward, and may combine the functionality for data storing, data sorting, metadata management, and data quality monitoring in a unified framework. The solution provides tools that help companies perform data assessments, view data lineage, and improve data traceability to support governance initiatives.

In other example embodiments, business object data services software is run on the client. In such an embodiment, a single enterprise-class solution is used for data integration, data quality, data profiling, and text data processing that allows users to integrate, transform, improve, and deliver trusted data to critical business processes.

Since both types of software run data profiling and are located on clients, the various data profiling techniques described herein can be run on either type of software. More particularly, SQL or other database control statements can be implemented in either business objects data services software or information steward software, which then can be used to interface with an index server containing data attribute calculations.

Systems, methods, and apparatuses for activity pattern detection are described herein. Embodiments may process large amounts of data—e.g., consumer logs, in order to detect events, perform data mining operations to detect patterns (e.g., two or more events appearing consecutively or non-consecutively), and present these patterns in a GUI (e.g., rendered within a GUI) to illustrate how a plurality of patterns may comprise a business scenario (as referred to herein, a business scenario identifies the operations performed by different business entities during a business process).

Embodiments may further build on an in-memory database platform (e.g., the SAP HANA platform for performing parallel processing of database data) and use path detection algorithms on sorted events to detect patterns and analyze business scenarios. Embodiments may comprise automatic systems for processing a large amount of information from different data sources, and for detecting common patterns among customer activities (as referred to herein, exemplary terms such as common patterns, sequences, and golden paths are interchangeable).

Companies typically log an amount of data that is too large for conventional tools to process. For example, an average telecommunications carrier creates and stores more than 1 TB of data every month. Companies have no capacity for analyzing this amount data to get useful insights in a timely manner.

As referred to herein, the term "big data" is used to describe data sets (e.g., database data) having a size that makes it impractical or impossible for commonly used software tools to capture, curate, manage, and process all the data set within acceptable time limits. Big data may comprise data related to business transactions, observations, and business-customer interactions. For business purposes, big data may include any combination of enterprise resource planning (ERP) data, customer relationship management (CRM) data, financial management data, project management data, supply management data, supplier relationship management data, human resources management data, executive management support data, compliance management data, etc.

Figure 4:
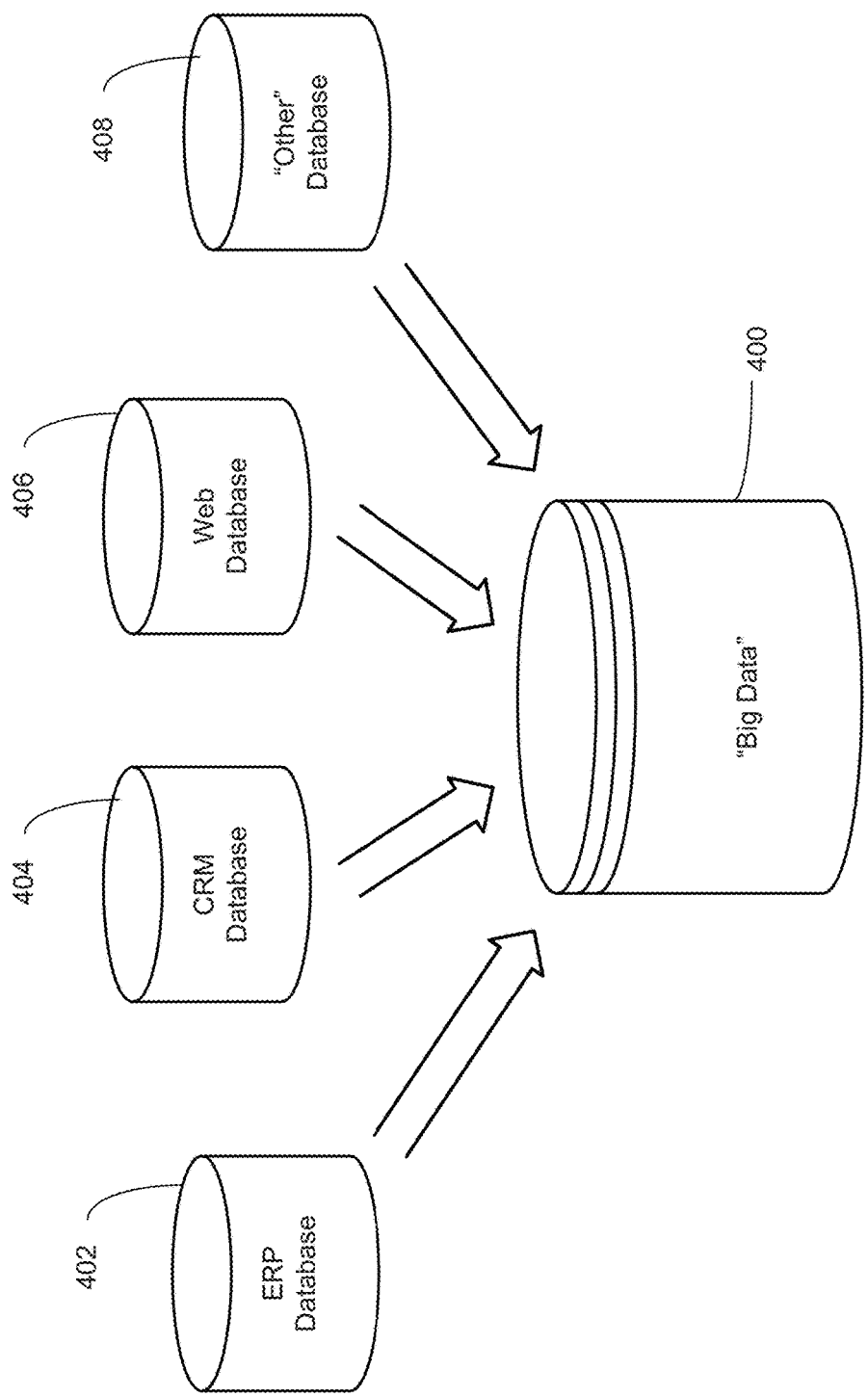
FIG. 4 is an illustration of a plurality of database sources for a big data database storage center in accordance with an example embodiment.

FIG. 4 is an illustration of a plurality of database sources for a big data database storage center in accordance with an example embodiment. A big data database storage center 400 is shown to comprise data from a plurality of different database sources; each of these database sources comprises some type of business data. As used herein, the term "business data" generally refers to data that is retrieved from a business intelligence system or service, such as a CRM, ERP, or other enterprise data system or service. Other types of data management systems, data services, and data stores may also serve the role of maintaining or providing business data. Furthermore, business data stored by a business intelligence system or service is not limited to data on a particular commercial enterprise, but may be provided for data on a group of entities, a group of persons, or an individual person (with such data being maintained for either or both of business and non-business purposes). A collection of business data retrieved from a business application may generally be referred to as a "business data object" and may be provided in any number of proprietary or open interoperable formats (including binary or textual data values). Business data may also generally be referred to herein as "contextual information," which refers to business data for a particular business object or entity.

In this embodiment, the big data database storage center 400 is shown to include ERP data from the ERP database source 402. The ERP data may be generated by an ERP subsystem used to coordinate the resources, information, and activities needed to complete business transactions such as billing, order fulfillment, etc. The ERP data may comprise internal and external management data collected from any and all departments of an organization. This management information may include, for example, financial and accounting information, sales and service information, manufacturing information, etc., maintained in the ERP database source 402. Business units can store and retrieve information from the ERP database source 402 (and the other database sources described below) in real-time.

The big data database storage center 400 is shown to further include CRM data from the CRM database source 404. The CRM data may be generated by CRM subsystems for customer centric business processes, such as sales opportunities, product marketing, service calls, project management, etc. The generated data may include information related to business partner information, appointments, activities, sales, marketing, customer service, customer profile information (e.g., data related to any customer contacts stored in the system). This customer data may include contact history, interaction history, purchase history, payment history, and customer attributes such as personal information about the customer, customer contact information, customer preferences, likes, and dislikes, etc. The CRM data may also include interactions with business support staff (e.g., in-person interactions, calls to support staff, etc.).

The big data database storage center 400 is shown to further include web data from the web data database 406. The web data may include customer interactions with a business over the Internet—for example, historical customer internet interactions such as website browsing, web-based transactions, e-mail messages live chats, etc.

The big data database storage center 400 may also include "other" data from the "other" data database 408, which may comprise data not stored in the ERP database source 402, the CRM database source 404, and the web data database 406. For example, the "other" data database 408 may include information associated with third party social networking sites (e.g., FACEBOOK, TWITTER), data managed by third party applications and/or stored in third party databases, cellular data such as short message service/multimedia messaging service (SMS/MMS) messages, etc.

Embodiments describe powerful analytics tools and processes capable of mining large amounts of data, such as the big data database storage center 400, and finding useful insights that may help business entities process this data (e.g., to understand their customers better) and help business entities make better business decisions. Furthermore, embodiments describe tools for business analysts to easily visualize data input and output with minimal user effort.

Figure 5:
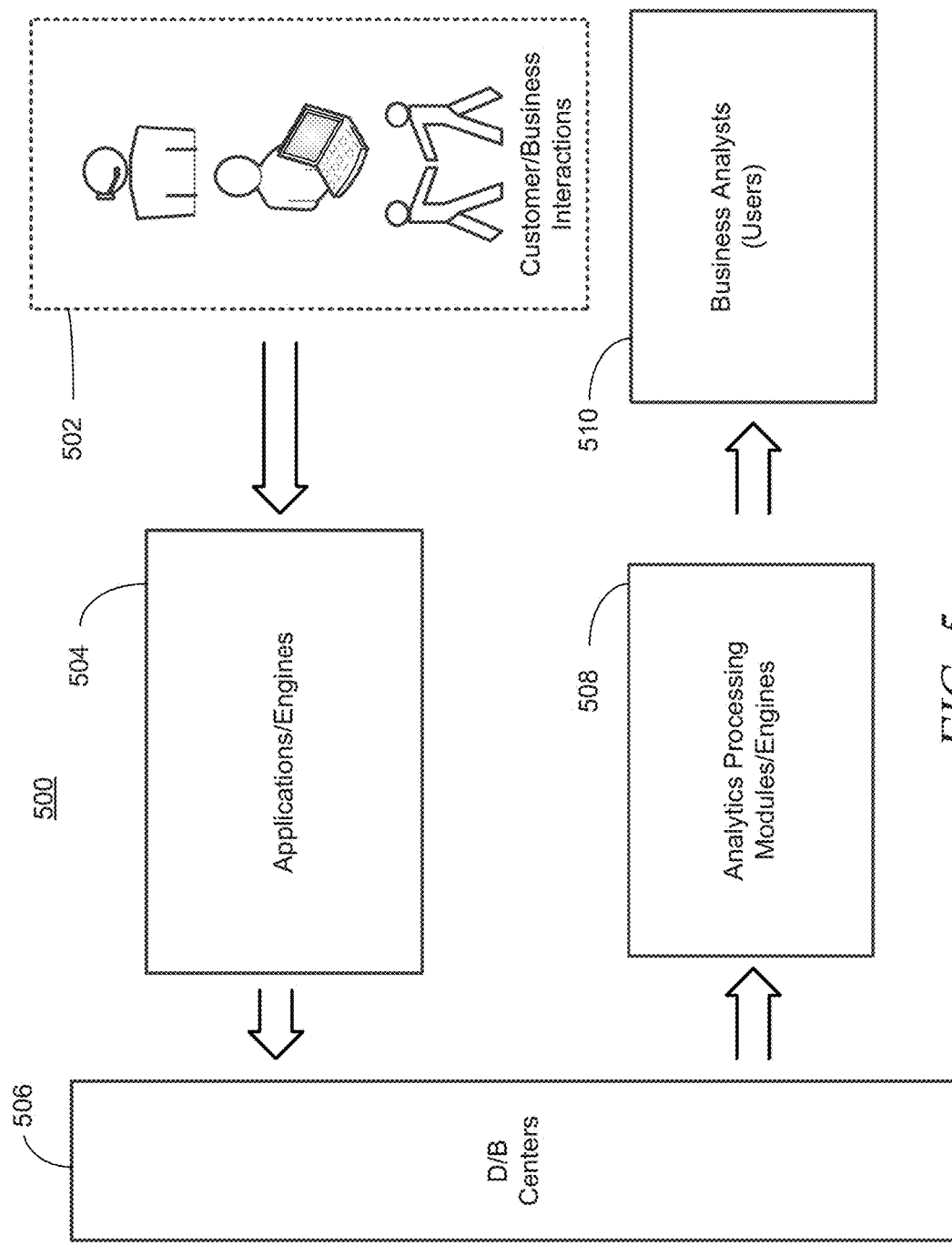
FIG. 5 is an illustration of a flow for generating analytics based on automatically detecting patterns in a "big data" database source in accordance with an example embodiment.

FIG. 5 is an illustration of a flow for generating analytics based on automatically detecting patterns in a "big data" database source in accordance with an example embodiment. A process flow 500 is illustrated as a process executed within a business computing environment. Business computing environments and business software implemented in these environments can provide useful support to business users. For example, enterprise software systems may include applications related to resource planning, human resources, supply chain management, client management, and other applications providing functionality supporting corresponding business scenarios. One example of a modern enterprise software system is SAP's Business Suite, utilizing service-oriented architecture (SOA) to serve industry-specific application modules to service consumers.

The process flow 500 is shown to accumulate data from any of the customer/business interactions 502 (e.g., in-person interactions, web-based interactions, support calls, etc.) for processing by various business applications (engines) 504. These applications (engines) 504 may comprise ERP or CRM applications automated to accumulate data related to the customer/business interactions 502 for storage in the one or more database centers 506. As discussed above, ERP and CRM systems often attempt to facilitate the flow of information between all business functions inside the organization, and to manage the distribution of information to entities that reside outside the organization. ERP and CRM systems generally operate in real-time (or near real-time) and store data in the database centers in real-time (or near real-time).

The data from the database centers 506 may be processed by one or more analytics processing modules (engines) 508. As referred to herein, analytics processing modules are executed to solve problems in business and industry using statistical and/or graphical analysis; this analysis is presented to one or more business analysts (users) 510 in a GUI format. The analytics processing modules (engines) 508 may access data related to customers, analyze customer behavior to identify events and patterns, and generate display data that illustrates relationships between the identified events and patterns. This generated data may assist end users (e.g., business analysts (users) 510) in better understanding customer needs.

The analytics processing modules (engines) 508 may execute processes for mining business data from the database centers 506 using statistical analysis and mathematics to discover and understand historical patterns in an effort to predict and improve future business performance. The analytics processing modules (engines) 508 may execute processes for operations research, enterprise decision management, marketing analytics, predictive science, strategy science, credit risk analysis, fraud analytics, etc. The analytics processing modules (engines) 508 may further be executed via the above described OLAP systems to generate data related to sales, marketing, management reporting, business process management, budgeting and forecasting, and financial reporting.

As discussed above, existing analytics modules cannot process data from database centers 506 if the data comprises "big data." To address the problems mentioned above, analytics processing modules (engines) 508 may execute automatic pattern detection processes for the customer/business interactions 502. Embodiments may provide an end-to-end process, which includes operations for creating important events based on transaction data from different data sources, defining different scenarios with a provision to filter based on many dimensions, detecting common patterns of activities using data mining approaches, presenting path discovery using a GUI representation (e.g., a Sankey chart), and providing the user an interface to select different paths. In these embodiments, the business analysts (users) 510 may analyze customers on a selected path and drill down to different Key Performance Indicators (KPI), such as Customer Tenure with the company, Average Revenue per User (ARPU), etc. The feature to export the data associated with customers that followed a selected path may help a business entity integrate this solution with other systems like campaign processing, etc.

As referred to herein, an event is an activity of interest that includes information identifying activity type and time. Events may be generated based on information from Business Support Systems (BSS) and/or Operation Support Systems (OSS). Depending on business use cases, different types of events may be generated. Initial operations may comprise defining relevant types of events and storing them in a Master Event table. Events may then be created for different entities (e.g., customers) from the logging information. Each type of event may use a specific Structured Query Language (SQL) script that may join several tables from different data sources. Generated events may be stored in an input table for use by data mining models.

Figure 6:
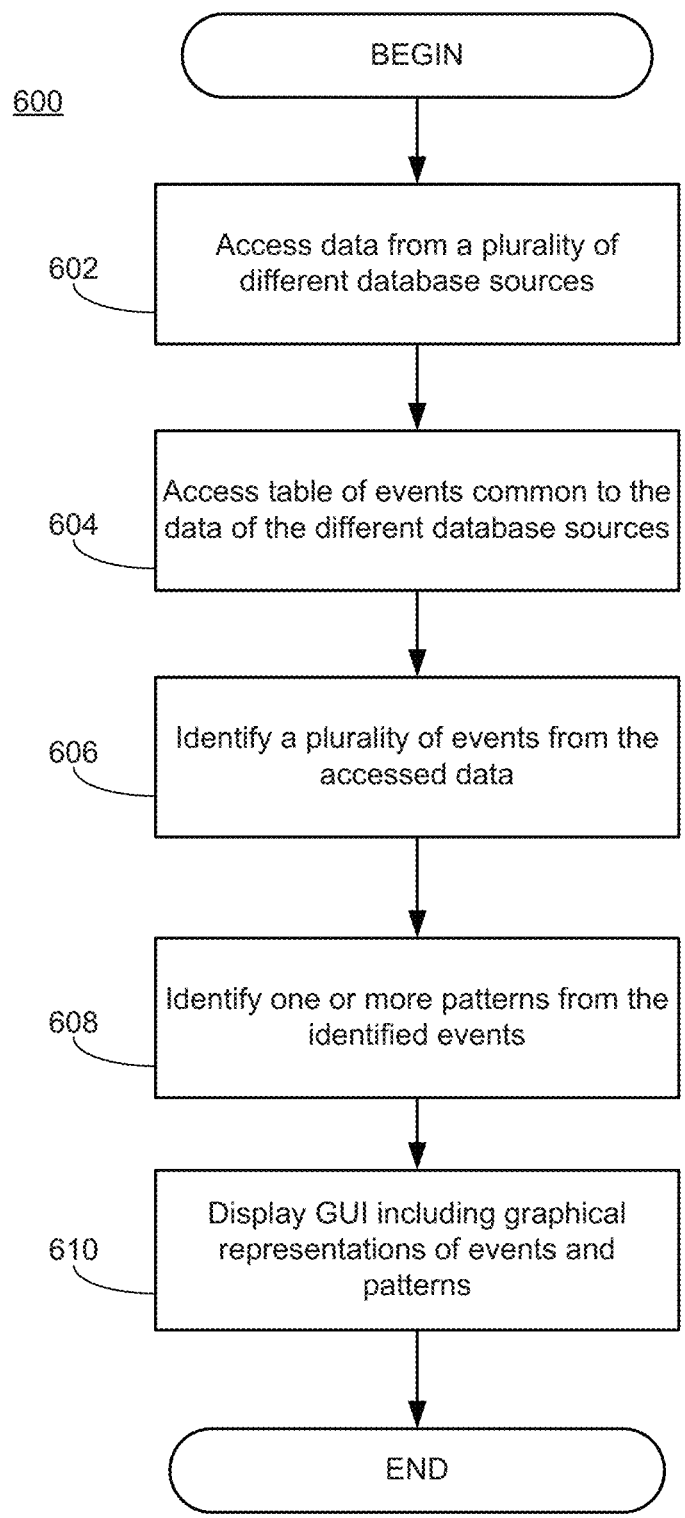
FIG. 6 is a logical flow diagram of a process for detecting common patterns in a "big data" database source in accordance with an example embodiment.

FIG. 6 is a logical flow diagram of a process for detecting common patterns in a "big data" database source in accordance with an example embodiment. Logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions may be performed in parallel. Additionally, one or more actions can be omitted in various embodiments; thus, not all actions are required in every implementation. Other process flows are possible.

Process 600 includes operations for accessing data from a plurality of different database sources (operation 602). In some embodiments, these different database sources may form a "big data" business database center including a network data database, an ERP data database, a CRM data database, and any other business data database as described above. In some embodiments, these database sources may comprise in-memory columnar databases to enable operations to be processed in parallel by different processors or processor cores.

An event table is accessed (operation 604); this event table includes events common to data from each of the plurality of database sources, and each event comprises data identifying an activity type and a time of occurrence. For example, a customer transaction such as a "billing inquiry" may be executed both via a network interface (and thus, included in a network data database) and via a subsequent in-person visit to a support center (and thus, included in a CRM data database).

Events are identified from the accessed data using the accessed event table (operation 606). From these identified events, one or more patterns are identified (operation 608). A pattern comprises a sequence of two or more events. In some embodiments, patterns comprise a sequence of two or more events occurring consecutively (e.g., events A-B-C-D occurring in that order with no intermediate event). In some embodiments, patterns may comprise a sequence including a first event, a second event, and any intermediate events between the first event and the second event (e.g., any event sequence having events A-B-C-D occurring in that order, such as A-B-B-C-D, A-B-E-C-D, etc.).

Figure 7A:
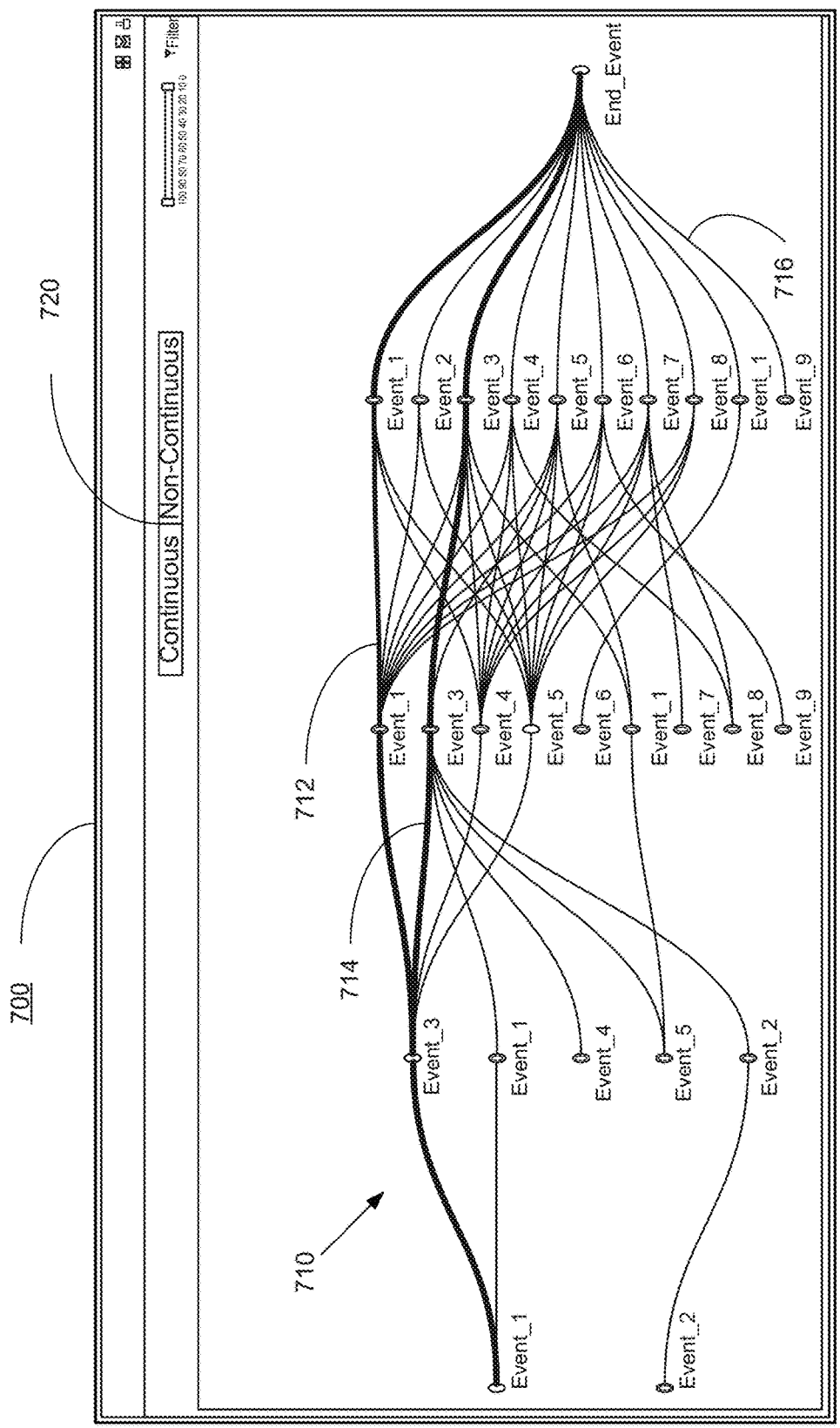
FIG. 7A-FIG. 7B illustrate an example graphical representation of events and patterns identified from a "big data" database in accordance with an example embodiment.
Figure 7B:
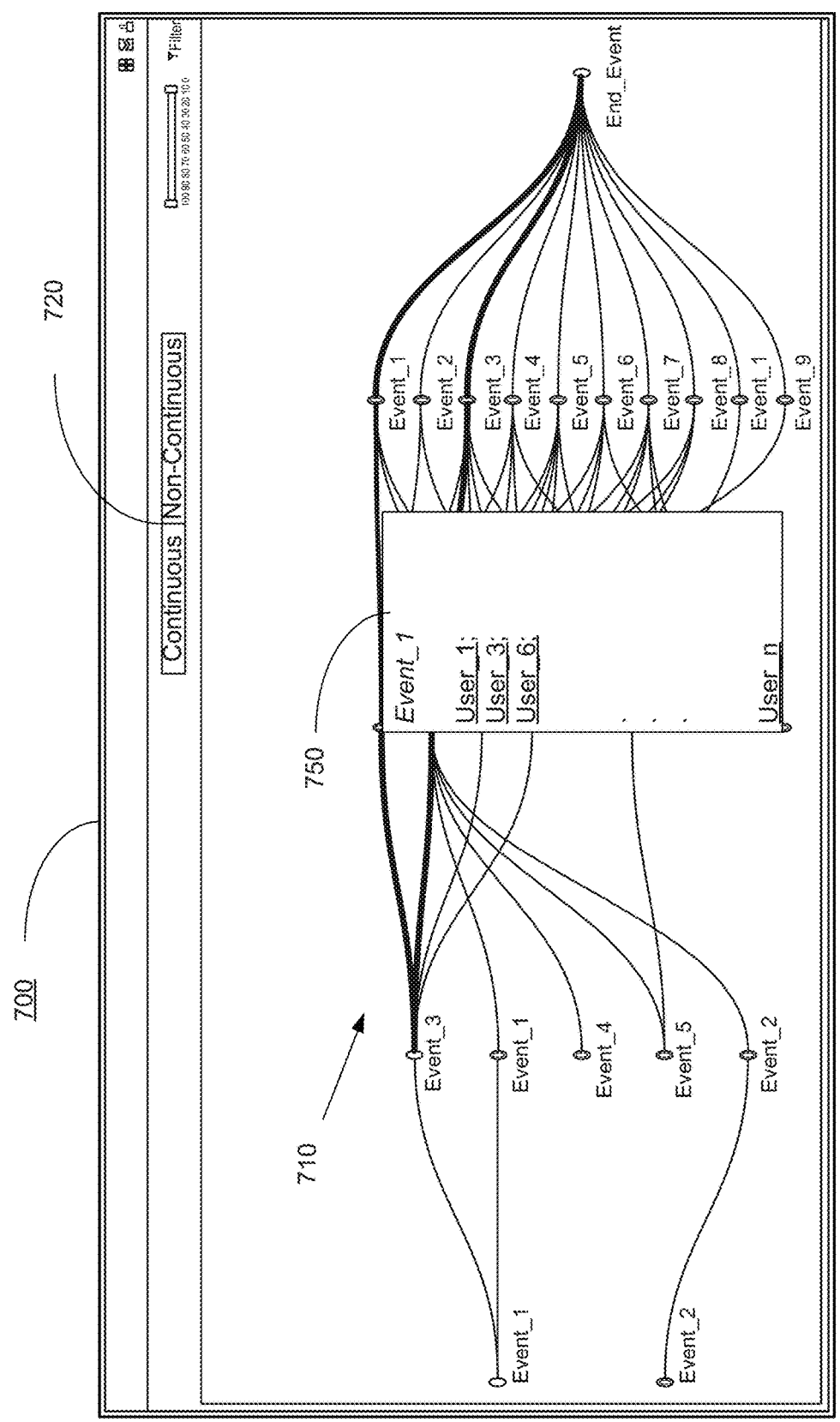

A graphical representation of the identified plurality of events and the identified one or more patterns is displayed via a GUI (operation 610). FIGS. 7A-FIG. 7B illustrate an example graphical representation of events and patterns identified from a "big data" database in accordance with an example embodiment. In this example, GUI 700 of FIG. 7A is illustrated as displaying (e.g., rendering a display) of a Sankey diagram 710—e.g., a flow diagram wherein the width/thickness of the paths are proportional to a respective flow quantity. The Sankey diagram 710 is shown to display various instances of events as nodes (e.g., Event_1 to Event_9) and patterns as paths traversing said nodes (e.g., paths 712, 714, and 716).

At each level, common events may or may not be combined, dependent on their preceding events (if any). The number of customers who have a particular event at a particular level is determined. Said number may be shown as the weight of a node in a network chart. Links between two events at two consecutive levels may also be created. The number of customers who go through each link (e.g., having two respective events) may be calculated and shown as the weight of the link in the network chart.

FIG. 7B illustrates a pop-up window 750 that may be displayed when a user selects a node via GUI 700 (e.g., by clicking or hovering a cursor over a node, etc.). The pop-up window 750 enables the user to drill down to event specific data. In this example, the pop-up window 750 displays identities of users associated with the selected node for Event_1. The pop-up window 750 is illustrated to further include selectable hyperlinks to access additional user-specific data (e.g., KPIs, such as Customer Tenure with the company, ARPU, etc.).

As discussed above, the displayed events may come from different databases of a "big data" database center. For exemplary purposes, the displayed events and patterns are subsequently described as telecommunications business data. Events related to telecommunication business data may be associated with four categories:

"Major" events, such as contract termination, line deactivation, change of SIM card, change of phone number, switch from post-paid to prepaid services (or vice-versa), equipment changes, tariff changes, obligation expired, optional package selection (e.g., cellular data packages), termination or discontinuation, account removal, etc.

Billing/invoice events, such as complaints about invoice through different channels (e.g., phone, in-person, or web-based complaints), invoice increases, roaming charge increases, late payments, etc.

Network quality events, such as daily dropped calls (e.g., more than 3 per day), weekly dropped calls (e.g., more than 20 per week), calls outside of network by more than 30% of volume, 2G/3G download/upload speed issues, etc.

Cross-channel events: customers contacting carrier (for any reason, such as registering a complaint, tech support, balance inquiry, balance dispute, personal information update, activate-deactivate package, change tariff, etc.) through different channels—e.g., in person at store, call to customer service, text SMS, etc. These events may help reveal how a customer moves from one channel to another for a same issue, or for different issues.

For exemplary purposes, Event_1 is described as representing a customer inquiring about an invoice (e.g., a billing/invoice event), Event_2 is described as representing a customer change of address (e.g., a cross-channel event), Event_3 is described as representing a complaint about cellular data download/upload speeds (e.g., a network quality event), and so forth. The End_Event may comprise a final event of a business scenario (e.g., a customer terminating his contract with the telecommunications provider, which would be a major event in the above described example). As discussed above, these events may occur in-person and be stored as CRM data, may occur over the internet and be stored as network data etc.; however, embodiments utilize definitions of events such that they may be identified in different database sources.

The diagram 710 is shown to display events in chronological order; thus certain events may be repeated several times in a pattern. The diagram paths 712 and 714 are shown to comprise four event patterns to the same endpoint (End_Event)—the pattern of the path 712 comprising a pattern of Event_1-Event_3-Event_1-Event_1, and the pattern of the path 714 comprising a pattern of Event_1-Event_3-Event_3-Event_2. As the diagram 710 comprises a Sankey diagram, the paths 712 and 714 are displayed in this example as "thicker" to indicate these paths as having the highest quantity of instances in the diagram (e.g., the dominant paths); other paths may be displayed "thinner" to indicate these paths as having a low quantity of instances (e.g., the outlier paths).

In this example, not all paths comprise the same number of nodes, as paths 712 and 714 comprise four event patterns to the End_Event, while path 716 comprises a single event pattern to the End_Event. As discussed above, data mining algorithms may be executed to discover event patterns.

Although not shown in this embodiment, embodiments allow users to define different insights with filter criteria to select a subset of customers based on factors such as geographic location, segments, etc., and also to filter the events that are processed as part of the insight based on event groups and on time periods. The processing of different insights may be scheduled and monitored to balance the load on the system in some embodiments.

Based on the request from business users, two exemplary approaches for data mining may be used by embodiments. GUI 700 shows input selection 720 for the user to find patterns with non-consecutive events or consecutive events. This approach for finding patterns with non-consecutive events allows for non-common events to happen between common events, and still be detected as a common pattern. The search space is extremely large in this approach because of the very high number of possible patterns. An implementation of cSPADE sequential pattern mining algorithm may be used in the first approach in some exemplary embodiments.

The approach for finding patterns with consecutive events finds patterns of consecutive common events. This approach assumes events in any pattern of interest happen all together and there are no other events in between. All customers' sequences are aligned by a common event (alternatively referred to herein as a pivot event), which is usually a beginning or ending event of a pattern or scenario. The level of other events in customers' sequences is calculated based on their relative position compared to the pivot event.

Figure 8:
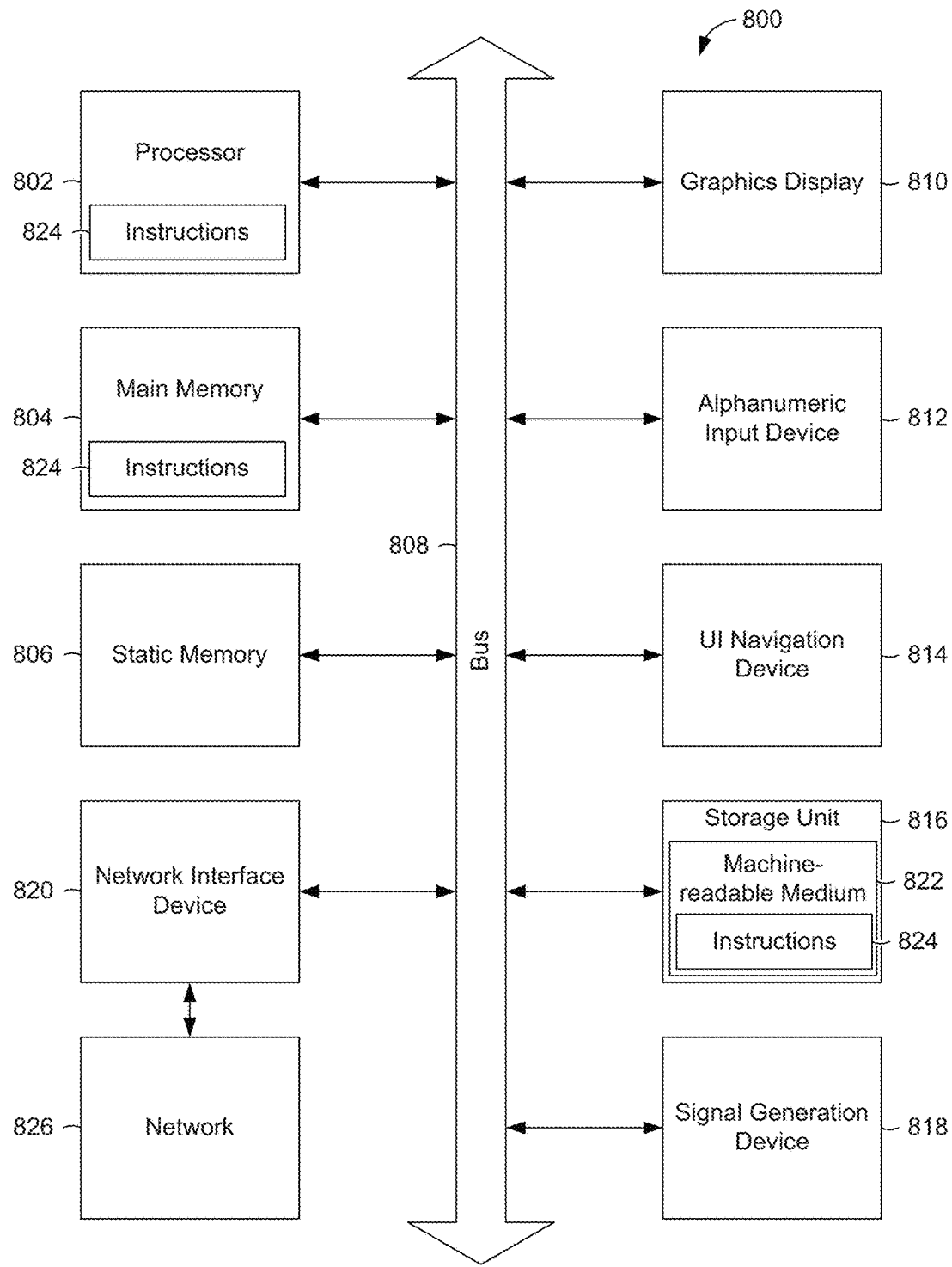
FIG. 8 is a block diagram of a computer processing system at a server system, within which a set of instructions for causing the computer to perform any one or more of the methodologies discussed herein may be executed.

FIG. 8 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a graphics processing unit (GPU) or both), main memory 804 and static memory 806, which communicate with each other via bus 808. The processing system 800 may further include graphics display 810 (e.g., a plasma display, a liquid crystal display (LCD) or a cathode ray tube (CRT)). The processing system 800 also includes alphanumeric input device 812 (e.g., a keyboard), a user interface (UI) navigation device 814 (e.g., a mouse, touch screen, or the like), a storage unit 816, a signal generation device 818 (e.g., a speaker), and a network interface device 820.

The storage unit 816 includes machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the processing system 800, the main memory 804 and the processor 802 also constituting computer-readable, tangible media.

The instructions 824 may further be transmitted or received over network 826 via a network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A system comprising:
   at least one hardware processor; and
   a machine-readable medium, coupled with the at least one hardware processor, comprising instructions which, when executed by the at least one hardware processor, cause the system to perform operations comprising:
   defining a plurality of event activity types for events;
   storing the plurality of event activity types in a master event table:
   accessing data from a plurality of different database sources, the plurality of different database sources comprising different types of data;
   identifying a plurality of events common to the data from the plurality of different database sources by determining which data from the different types of data in the plurality of different database sources is common across the plurality of different database sources, each event comprising an event activity type defined in the master event table and an event time of occurrence;
   generating an event table comprising the identified plurality of events common to the data from the plurality of different database sources, and data identifying the event activity type and the event time of occurrence;
   identifying, using the event table one or more patterns of the identified plurality of events comprising a sequence of two or more events occurring consecutively based on the event time of occurrence for each event;
   determining a number of users having a particular event to define a weight associated with an instance of an event:
   rendering a graphical representation of the identified plurality of events and the identified one or more patterns, comprising instances of the plurality of events as nodes and the weight associated with the instance of the event, and the one or more patterns as paths traversing the nodes.

2. The system of claim 1, wherein the plurality of different database sources comprise business data databases including a network data database, an Enterprise Resource Planning (ERP) data database, and a Customer Relationship Management (CRM) data database.

3. The system of claim 1, wherein the sequence of two or more events occurring consecutively comprises a sequence including a first event, a second event, and any intermediate events between the first event and the second event.

4. The system of claim 1, wherein the identified one or more patterns comprise different sequences of events having a same first event.

5. The system of claim 1, wherein the identified one or more patterns comprise different sequences of events having a same last event.

6. The system of claim 1, wherein the graphical representation comprises a Sankey diagram.

7. The system of claim 1, wherein the identified one or more patterns comprise patterns defined by a user.

8. The system of claim 1, wherein the graphical representation of each of the identified plurality of events further comprises a data link for accessing respective database data corresponding to each of the identified plurality of events.

9. The system of claim 1, wherein the plurality of different database sources comprise in-memory, columnar databases.

10. The system of claim 1, wherein each node in the graphical representation comprises a weight indicating the number of entities having the event representing each node at a particular level.

11. The system of claim 1, wherein rendering the graphical representation of the identified plurality of events and the identified one or more patterns further comprises creating links between two events at two consecutive levels and wherein each link of the links between two events at two consecutive levels comprise a weight indicating a number of entities having two respective events.

12. The system of claim 1, wherein a pop-up window is displayed when a node associated with an event is selected, the pop-up window displaying identities of users associated with the selected node for the event.

13. The system of claim 1, wherein at least one instance of an event occurs in more than one pattern.

14. A method comprising:
defining a plurality of event activity types for events;
storing the plurality of event activity types in a master event table;
accessing data from a plurality of different database sources, the plurality of different database sources comprising different types of data;
identifying a plurality of events common to the data from the plurality of different database sources by determining which data from the different types of data in the plurality of different database sources is common across the plurality of different database sources, each event comprising an event activity type defined in the master event table and an event time of occurrence;
generating an event table comprising the identified plurality of events common to the data from the plurality of different database sources, and data identifying the event activity type and the event time of occurrence;
identifying, using the event table, one or more patterns of the identified plurality of events comprising a sequence of two or more events occurring consecutively based on the event time of occurrence for each event;
determining a number of users having a particular event to define a weight associated with an instance of an event;
displaying, via a graphical user interface (GUI), a graphical representation of the identified plurality of events and the identified one or more patterns, comprising instances of the plurality of events as nodes and the weight associated with the instance of the event and the one or more patterns as paths traversing the nodes.

15. The method of claim 14, wherein the plurality of different database sources comprise business data databases including a network data database, an Enterprise Resource Planning (ERP) data database, and a Customer Relationship Management (CRM) data database.

16. The method of claim 14, wherein the sequence of two or more events occurring consecutively comprises a sequence including a first event, a second event, and any intermediate events between the first event and the second event.

17. The method of claim 14, wherein the graphical representation of each of the identified plurality of events further comprises a data link for accessing respective database data corresponding to each of the identified plurality of events.

18. A non-transitory machine-useable storage medium embodying instructions which, when executed by a machine, cause the machine to execute operations comprising:
defining a plurality of event activity types for events;
storing the plurality of event activity types in a master event table:
accessing data from a plurality of different database sources, the plurality of different database sources comprising different types of data;
identifying a plurality of events common to the data from the plurality of different database sources by determining which data from the different types of data in the plurality of different database sources is common across the plurality of different database sources, each event comprising an event activity type defined in the master event table and an event time of occurrence;
generating an event table comprising the identified plurality of events common to the data from the plurality of different database sources, and data identifying the event activity type and the event time of occurrence;
identifying, using the event table one or more patterns of the identified plurality of events comprising a sequence of two or more events occurring consecutively based on the event time of occurrence for each event;
determining a number of users having a particular event to define a weight associated with an instance of an event:
displaying, via a graphical user interface (GUI) a graphical representation of the identified plurality of events and the identified one or more patterns, comprising instances of the plurality of events as nodes and the weight associated with the instance of the event and the one or more patterns as paths traversing the nodes.

19. The non-transitory machine-useable storage medium of claim 18, wherein the plurality of different database sources comprise business data databases including a network data database, an Enterprise Resource Planning (ERP) data database, and a Customer Relationship Management (CRM) data database.

20. The non-transitory machine-useable storage medium of claim 18, wherein the sequence of two or more events occurring consecutively comprises a sequence including a first event, a second event, and any intermediate events between the first event and the second event.

21. The non-transitory machine-useable storage medium of claim 18, wherein the identified one or more patterns comprise different sequences of events having a same first event or wherein the identified one or more patterns comprise different sequences of events having a same last event.

22. The non-transitory machine-useable storage medium of claim 18, wherein the graphical representation comprises a Sankey diagram.

23. The non-transitory machine-useable storage medium of claim 18, wherein the identified one or more patterns comprise patterns are defined by a user.

24. The non-transitory machine-useable storage medium of claim 18, wherein the graphical representation of each of the identified plurality of events comprises a data link for accessing respective database data corresponding to each of the identified plurality of events.

25. The non-transitory machine-useable storage medium of claim 18, wherein the plurality of different database sources comprise in-memory, columnar databases.

* * * * *